(12) United States Patent
Sakuma et al.

(10) Patent No.: US 7,814,323 B2
(45) Date of Patent: Oct. 12, 2010

(54) PROGRAM, CLASSIFICATION METHOD AND SYSTEM

(75) Inventors: Jun Sakuma, Meguro-ku (JP); Naohiko Uramoto, Yokohama (JP)

(73) Assignee: International Business Machines Corporation, Armonk, NY (US)

(*) Notice: Subject to any disclaimer, the term of this patent is extended or adjusted under 35 U.S.C. 154(b) by 742 days.

(21) Appl. No.: 11/443,624

(22) Filed: May 31, 2006

(65) Prior Publication Data
US 2007/0283168 A1 Dec. 6, 2007

(30) Foreign Application Priority Data
May 31, 2005 (JP) ............... 2005-160528

(51) Int. Cl.
*H04L 9/32* (2006.01)
(52) U.S. Cl. ...................................... 713/171; 380/54
(58) Field of Classification Search .................. 713/171
See application file for complete search history.

(56) References Cited

U.S. PATENT DOCUMENTS

| | | | | |
|---|---|---|---|---|
| 5,196,840 A | * | 3/1993 | Leith et al. ............ | 340/5.26 |
| 5,212,784 A | * | 5/1993 | Sparks .................. | 714/6 |
| 5,568,556 A | * | 10/1996 | Conley ................. | 380/54 |
| 5,659,616 A | * | 8/1997 | Sudia ................... | 705/76 |
| 5,793,870 A | * | 8/1998 | Conley ................. | 380/54 |
| 5,857,022 A | * | 1/1999 | Sudia ................... | 713/173 |
| 5,894,521 A | * | 4/1999 | Conley ................. | 380/54 |
| 5,963,642 A | * | 10/1999 | Goldstein ............. | 713/193 |
| 5,966,441 A | * | 10/1999 | Calamera ............. | 713/167 |
| 6,009,177 A | * | 12/1999 | Sudia ................... | 713/191 |
| 6,157,917 A | * | 12/2000 | Barber .................. | 705/26 |
| 7,493,661 B2 | * | 2/2009 | Liu et al. .............. | 726/28 |

FOREIGN PATENT DOCUMENTS

JP 2000-68864 3/2000

OTHER PUBLICATIONS

"Information Sharing Across Private Databases,"Agrawal, Rakesh, Evfimievski, Alexandre, Srikant, Ramakrishnan, Published: Jun. 2003.*

(Continued)

*Primary Examiner*—Kambiz Zand
*Assistant Examiner*—Dant B Shaifer Harriman
(74) *Attorney, Agent, or Firm*—Ken Corsello; Shimokaji & Assoc.

(57) ABSTRACT

A system and method classifies multiple pieces of private data owned by multiple entities according to data type. Each of the entities has an encryption key. A representative entity is selected that is representative of the entities owning data of the type. Data of each of the representative entity and a target entity is encrypted and the encrypted data is exchanged between the entities. Each piece of the encrypted data that the target entity has obtained is re-encrypted by using its own encryption key to obtain data 1, and the encrypted data that the representative entity has obtained is re-encrypted by using its own encryption key to obtain data 2. If data 1 of the representative entity matches data 2, it is determined that the representative entity and the target entity have data of an identical type.

3 Claims, 14 Drawing Sheets

OTHER PUBLICATIONS

"Information Sharing Across Private Databases," by Rakesh Agrawal, Alexandre Evfimieski, Ramakrishan, Srikant, Published SIGMOD 2003, Jun. 9-12, 2003, San Diego, CA. Copyright 2003 ACM 1-58113-634-X/03/06.*

Masayuki Numao, "Security and privacy for attribute specification type dynamic community production", Journal of Information Processing Society of Japan, Japan, Information Processing Society of Japan, Jan. 15, 2004, vol. 45, No. 1 p. 103-111.

Michiel E. Houle, "Fast Approximate Similarity Search in Extremely High-Dimensional Data Sets", Data Engineering, 2005, ICDE 2005 Proceedings 21st International Conference in Apr. 2005, No. 8556254, p. 619-630, http://ieeexplore.ieee.or.g/ie15/9680/30564/01410179.pdf?arnumber=1410179.

Jun Sakuma, "Secured SNPs linkage analysis by multiparty", Collected Papers of Computer Security Symposium 2005 (CSS2005), Oct. 26, 2005, vol. I of II, p. 187-192.

"A Proposed Architecture for Trusted Third Party Services", N. Jefferies, C. Mitchell, and M. Walker, in Cryptography: Policy and Algorithms, Springer LNCS v. 1029, pp. 98-110.

"Information sharing across private databases", R. Agrawal, A. Evfimievski, and R. Srikant, In Proceedings of SIGMOD 2003.

"Protocol for private list matching", Masayuki Numao, CSS 2001 Abstracts.

"A public key cryptosystem and a signature scheme based on discrete logarithms," T. ElGamel, IEEE Transactions on Information Theory, IT-31 (4): 469, 72, Jul. 1985.

* cited by examiner

[Figure 1]
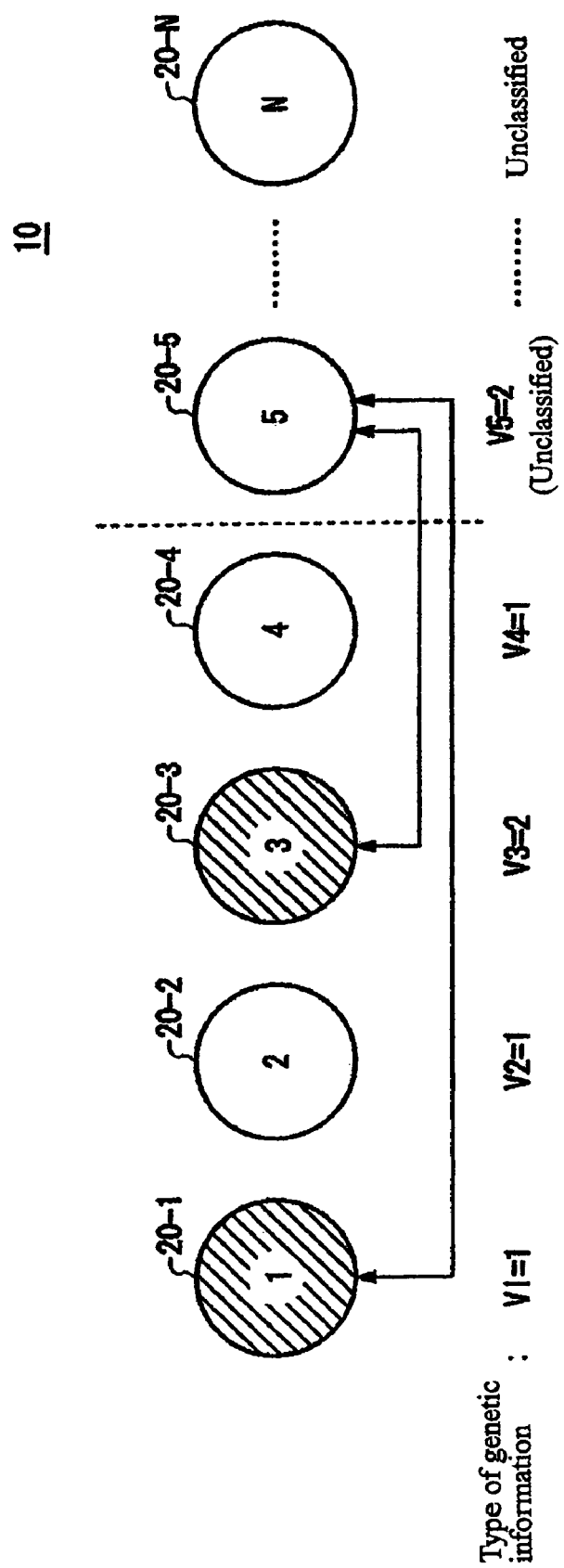

[Figure 2]
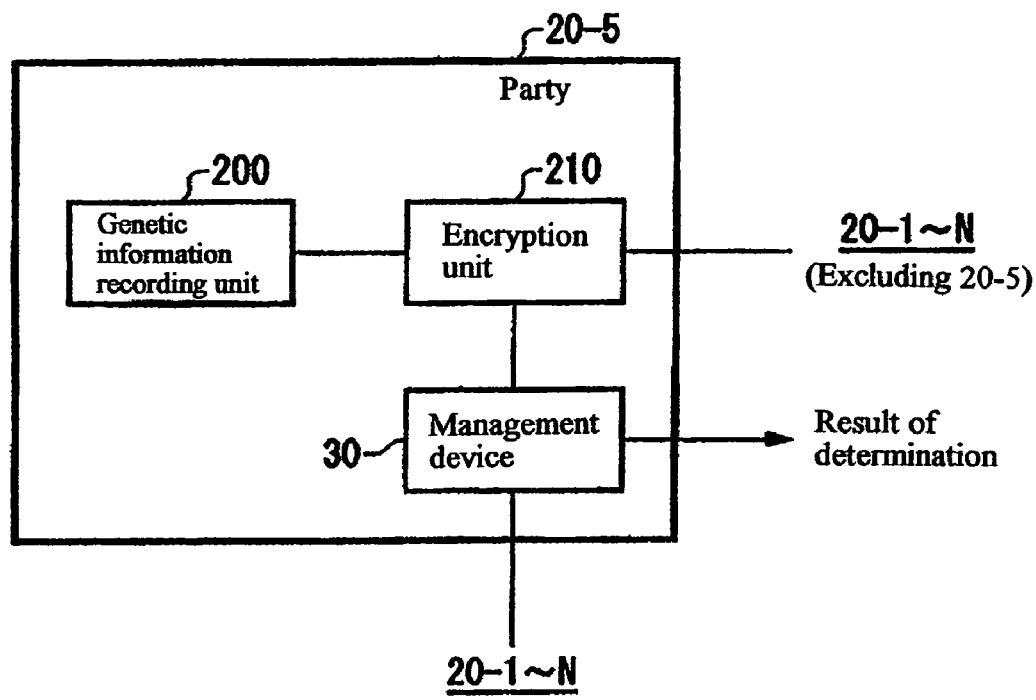

[Figure 3]
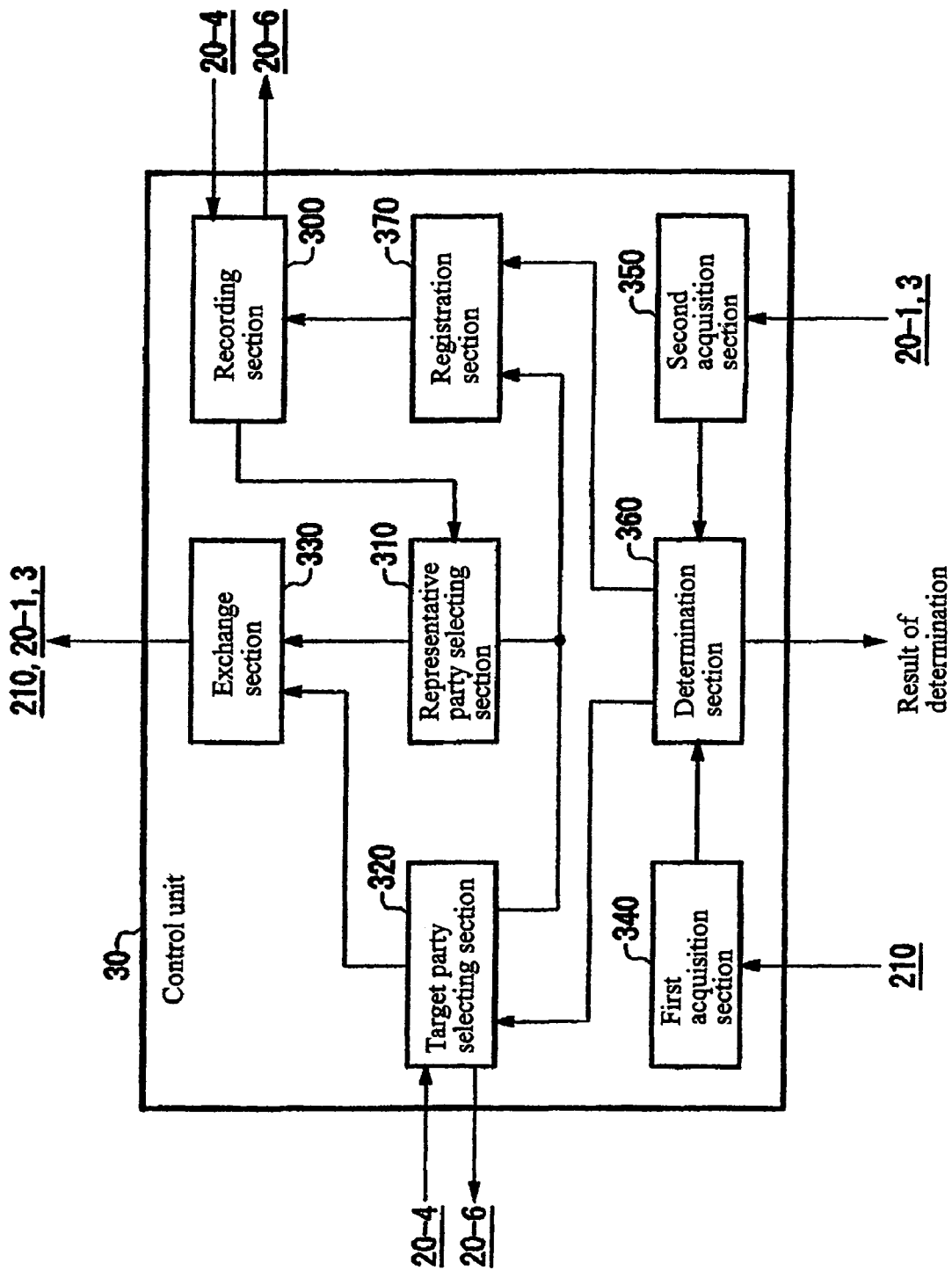

[Figure 4]
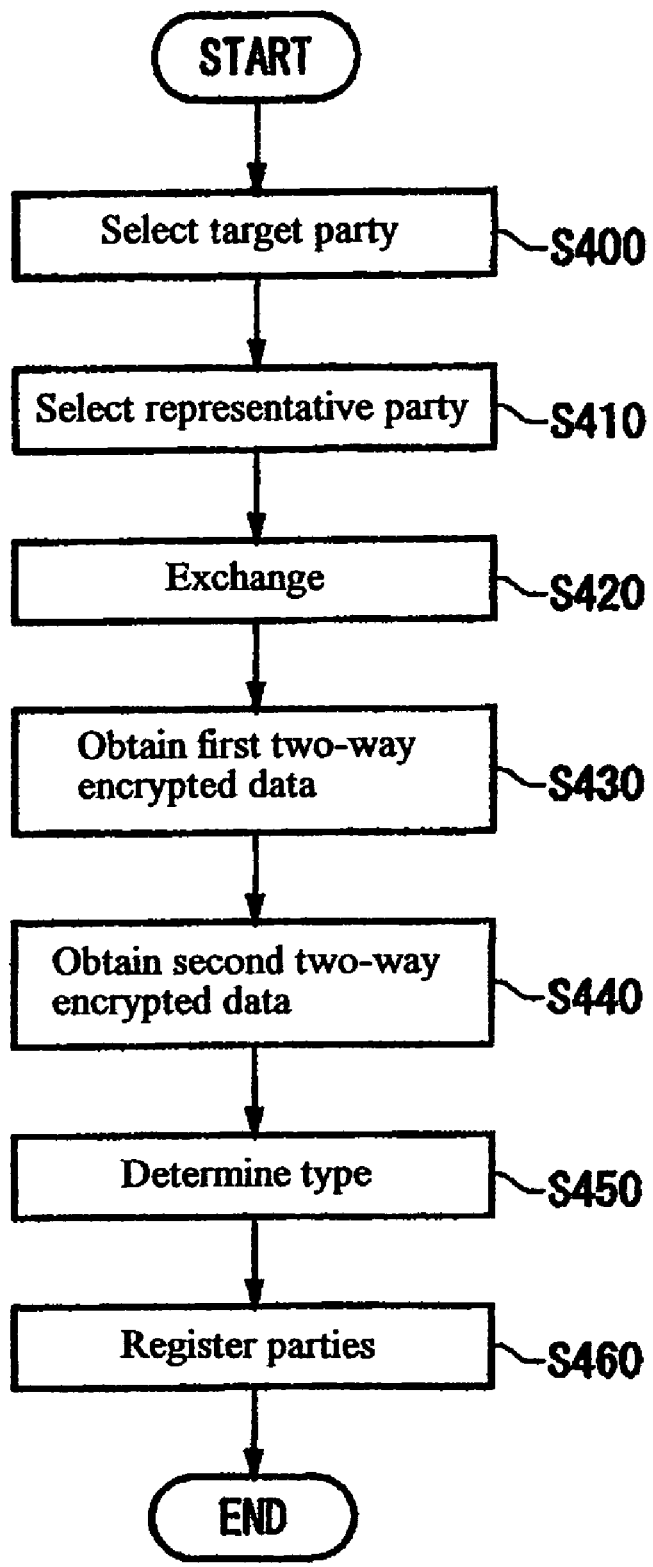

[Figure 5]
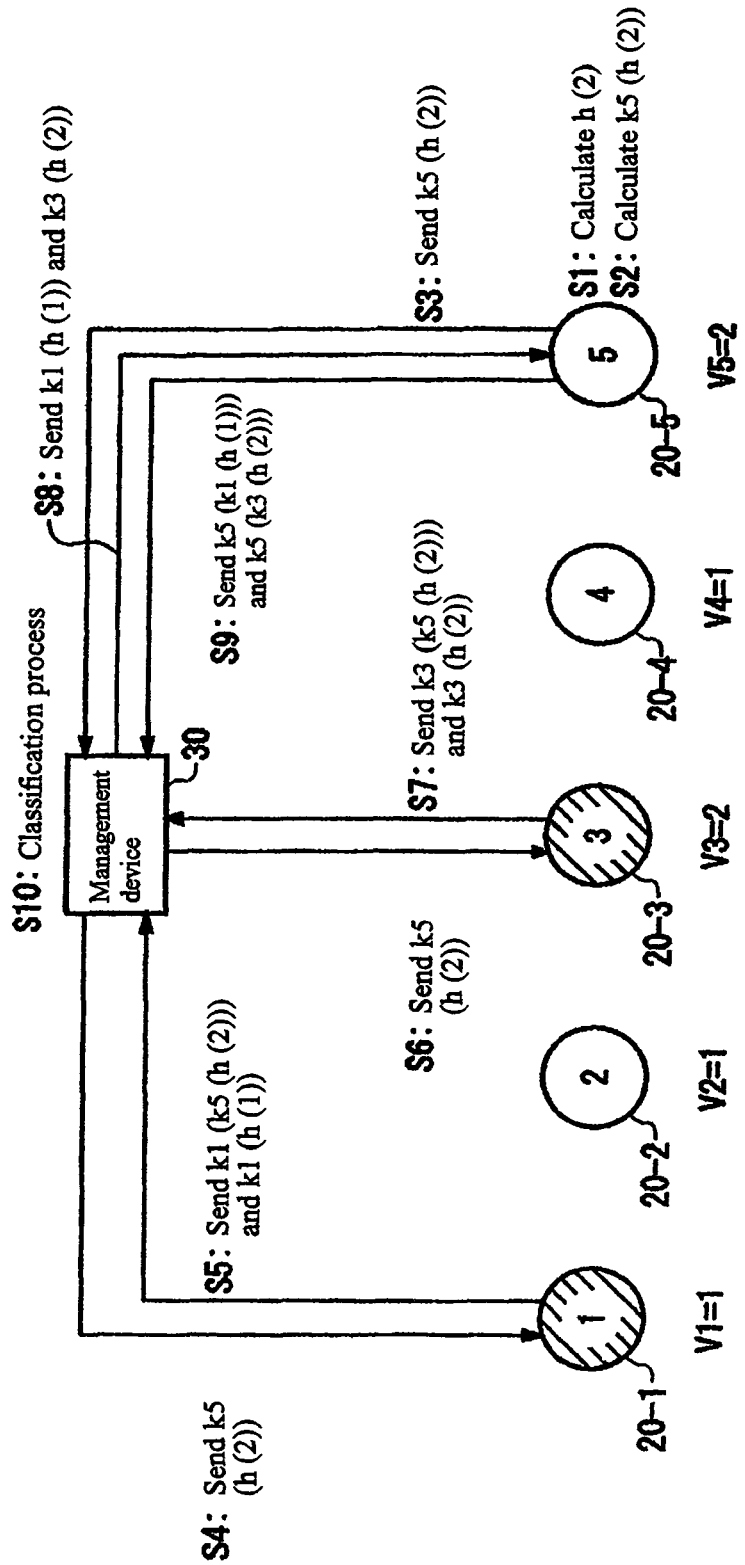

[Figure 6]
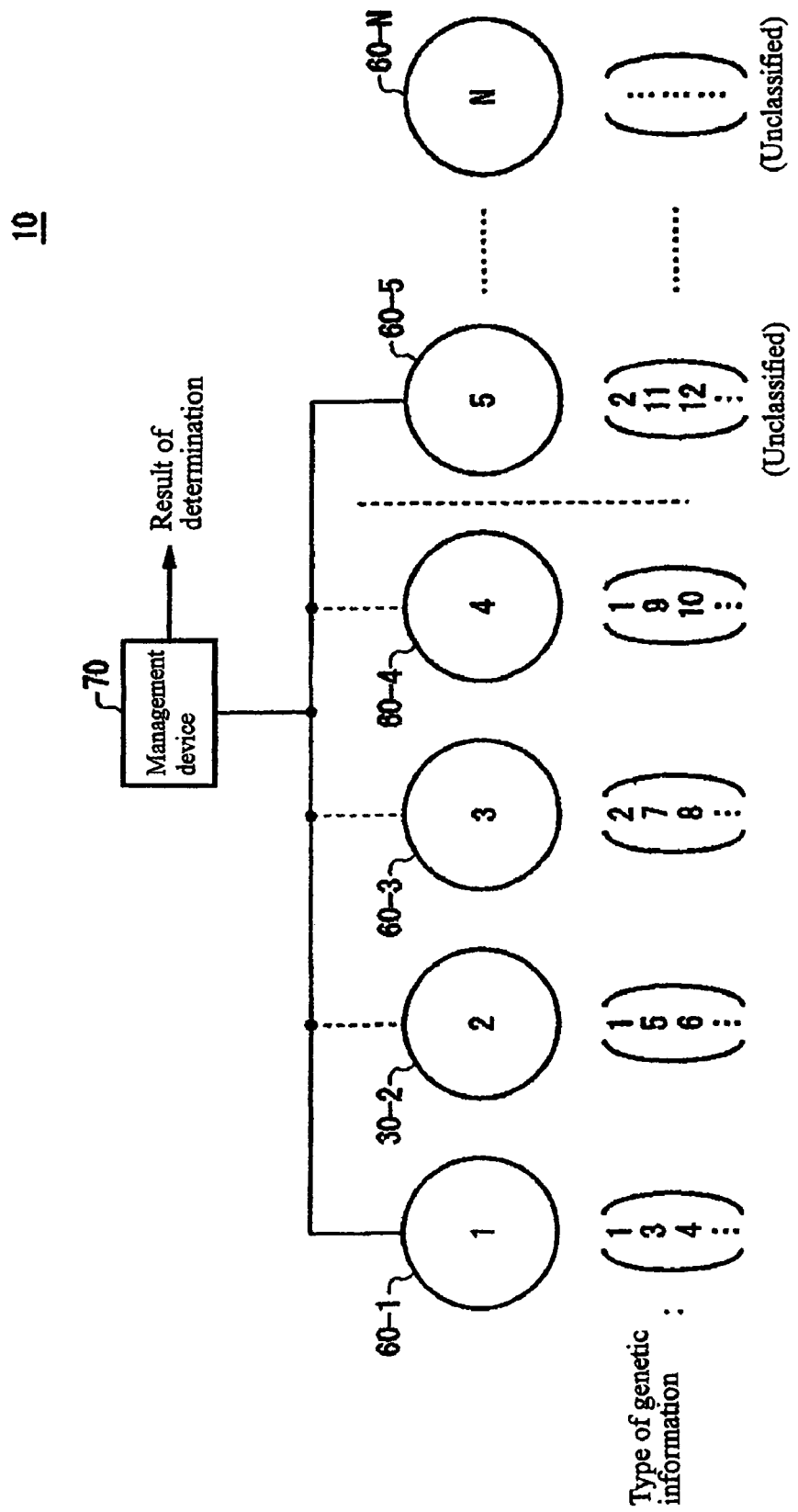

[Figure 7]
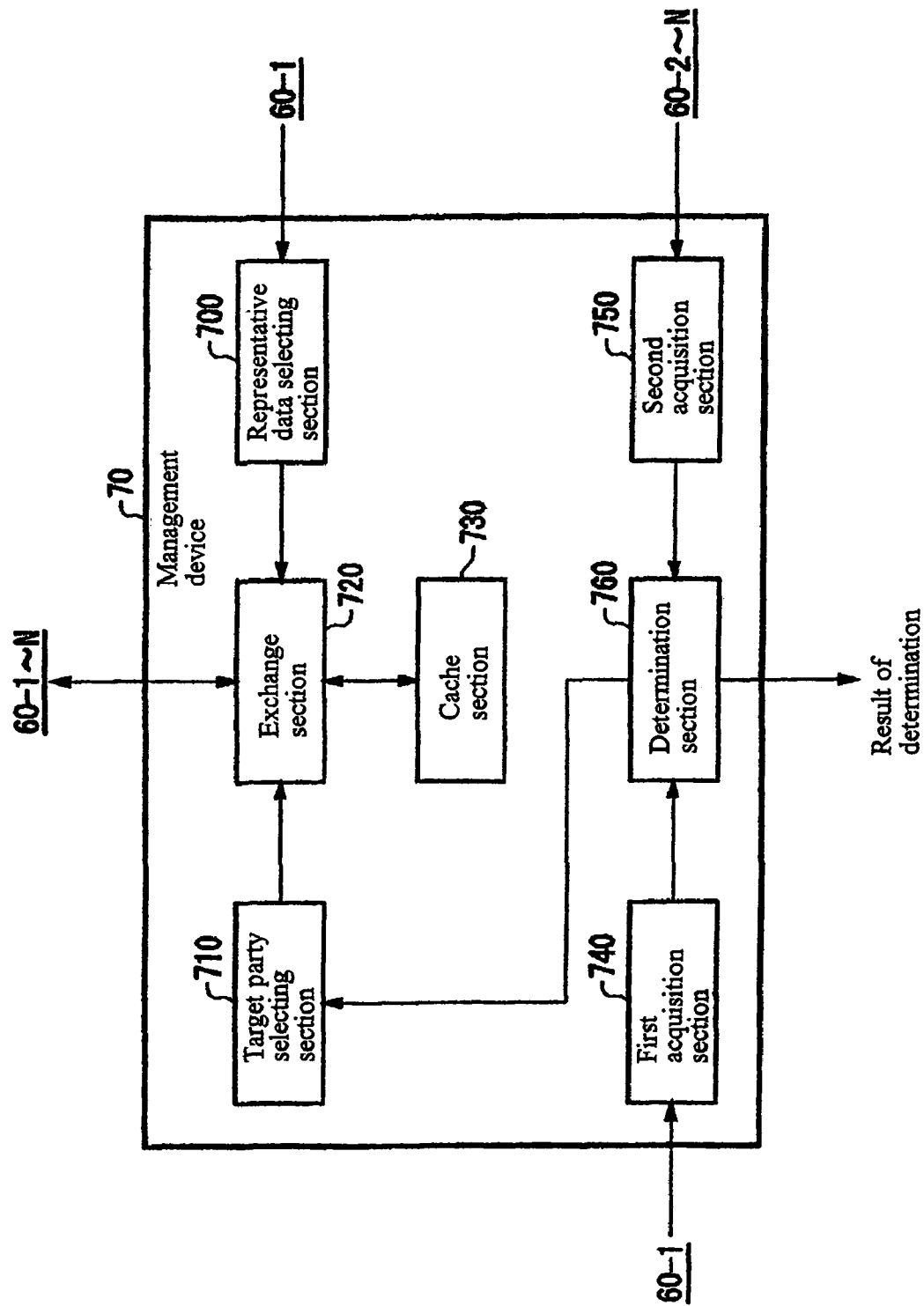

[Figure 8]
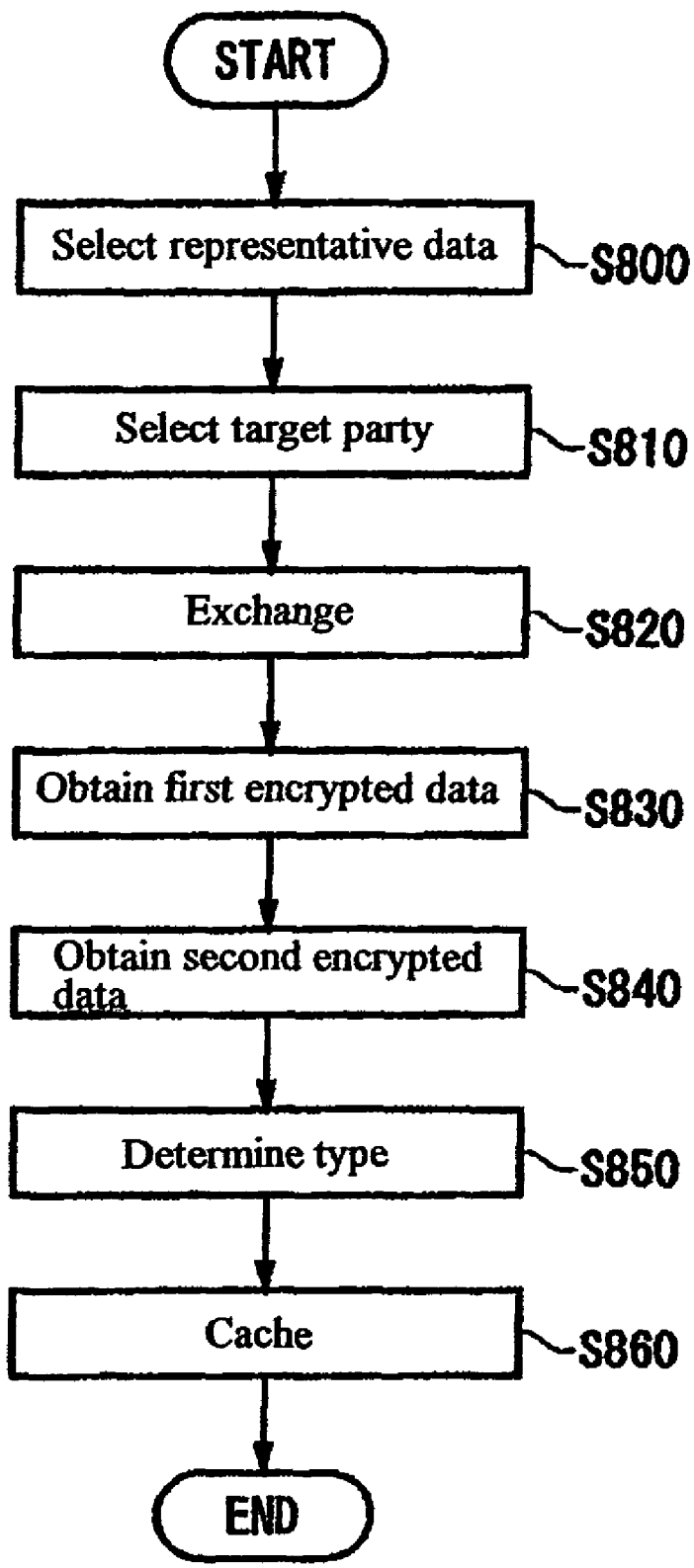

[Figure 9]
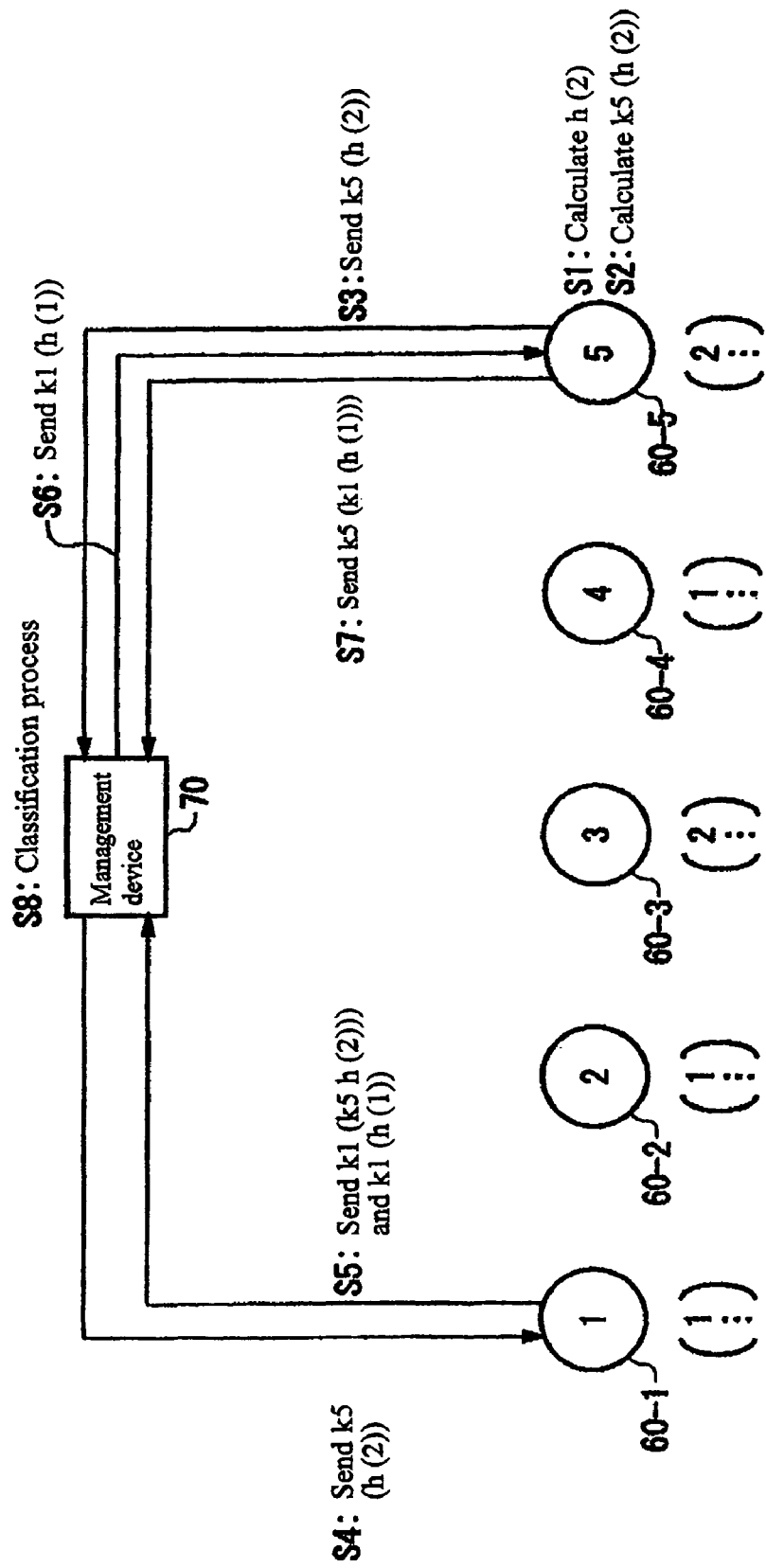

[Figure 10]
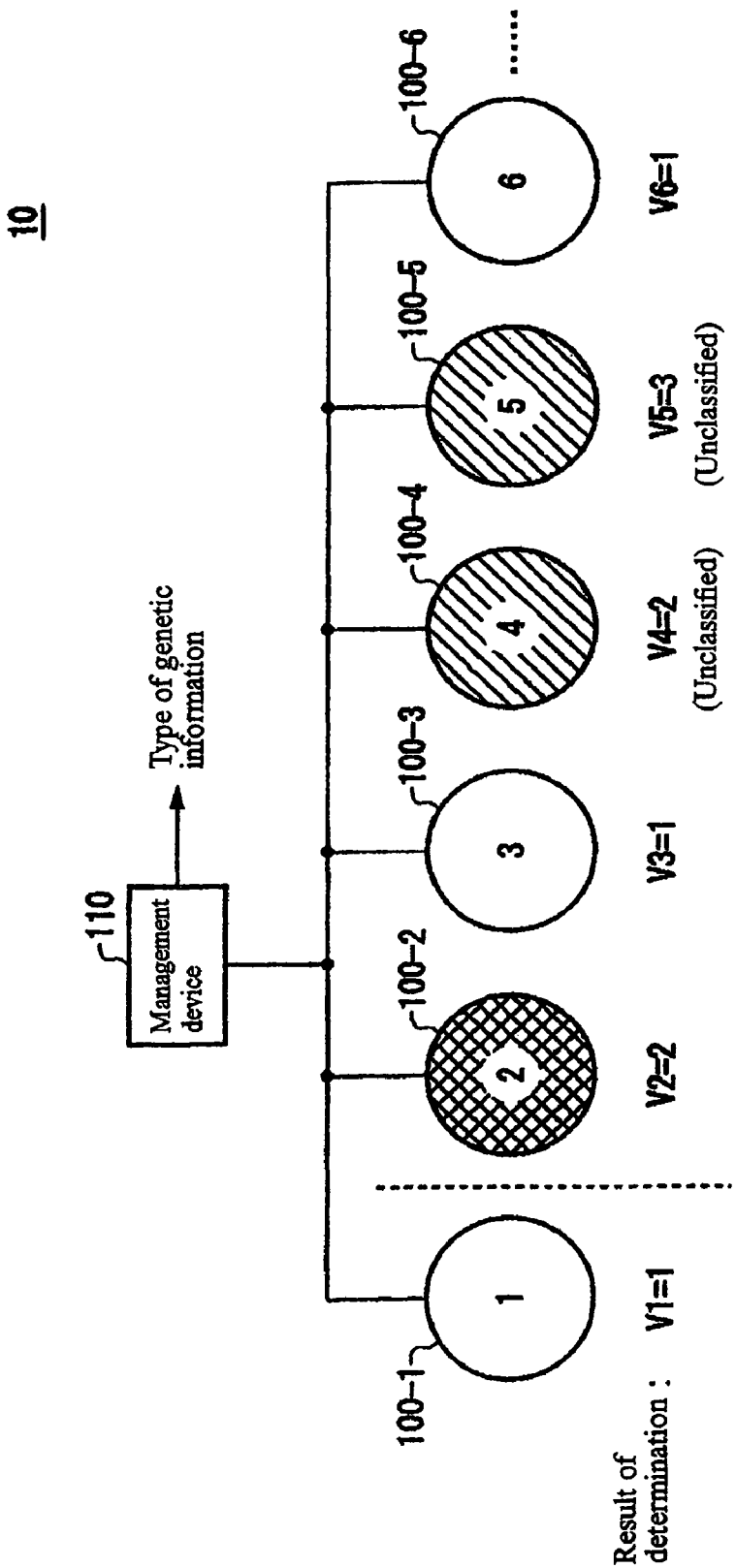

[Figure 11]
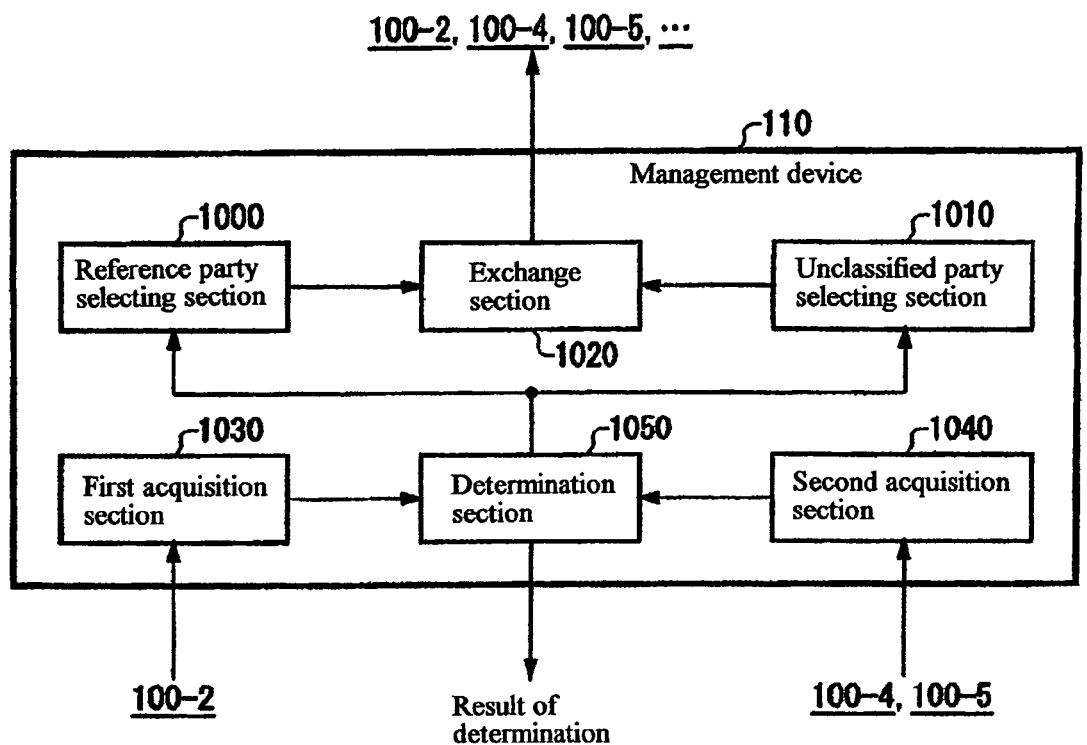

[Figure 12]
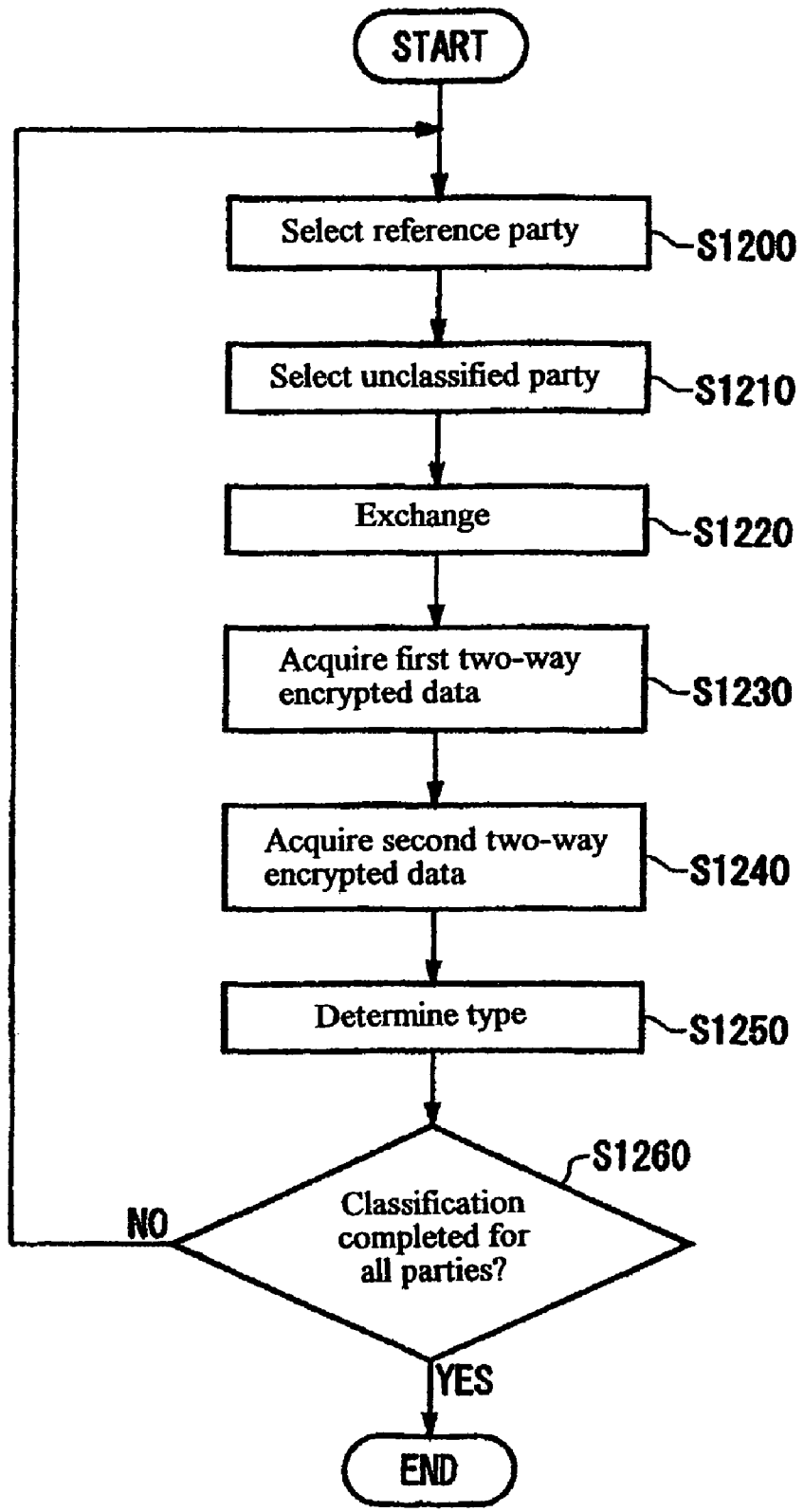

[Figure 13]
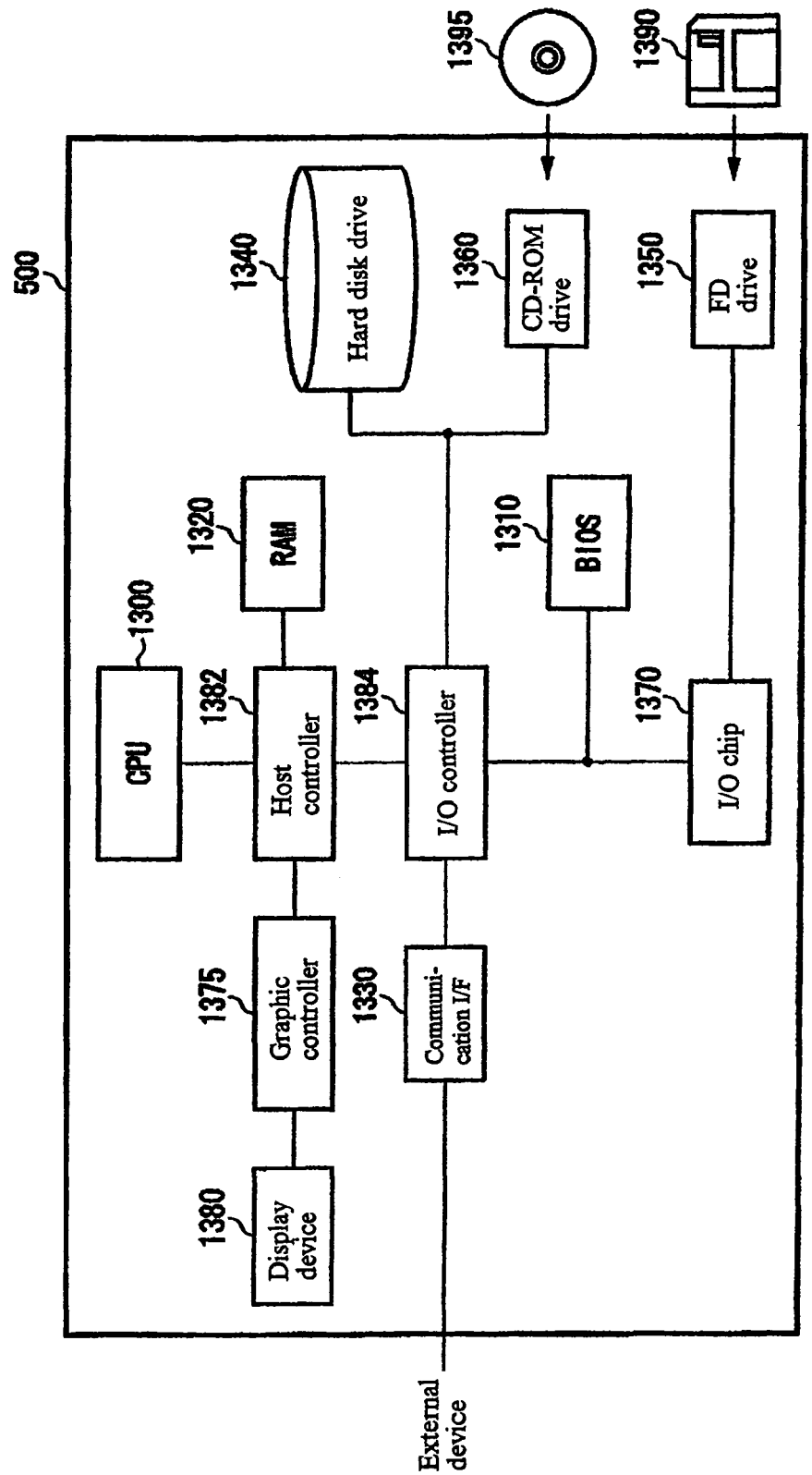

[Figure 14]
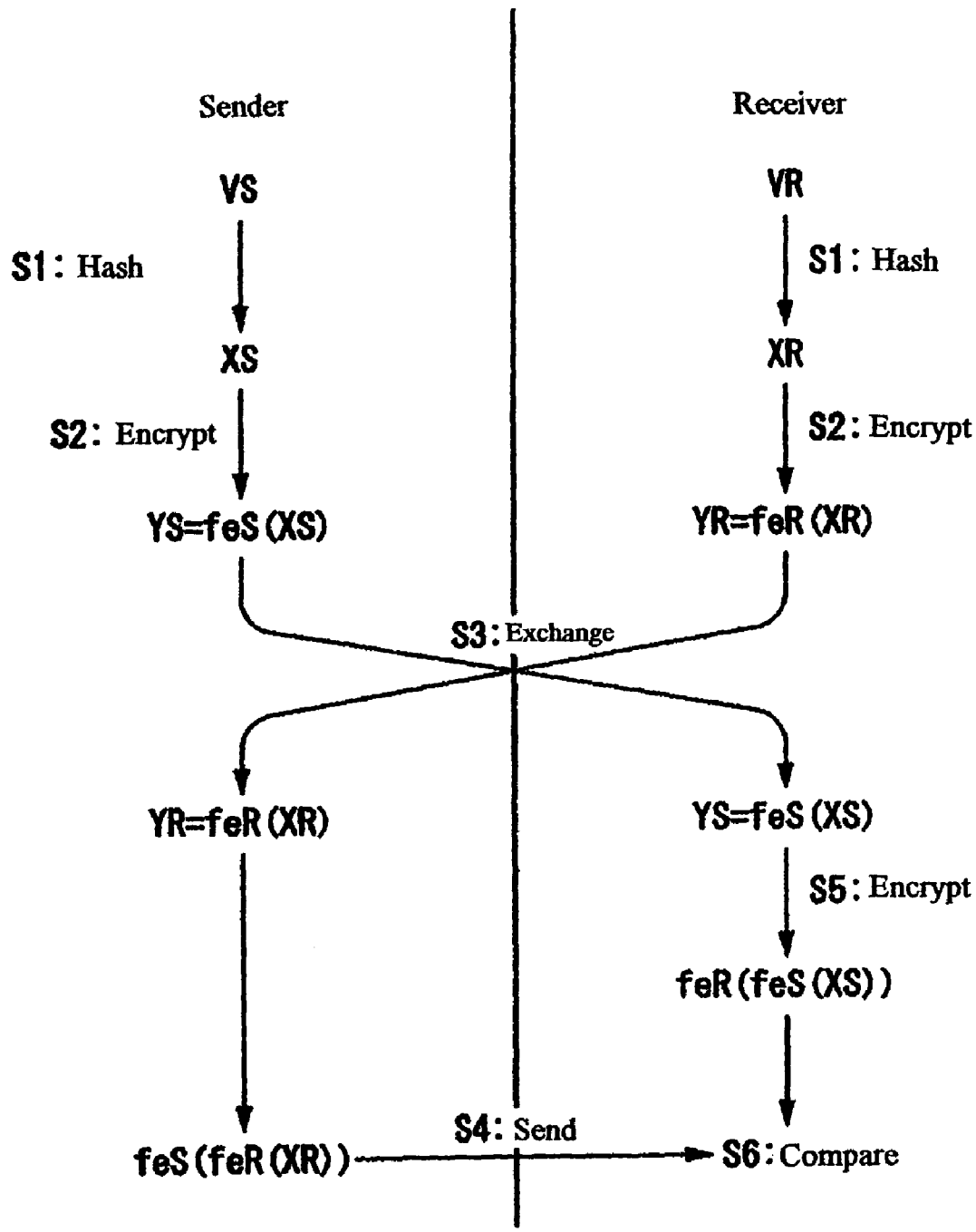

PROGRAM, CLASSIFICATION METHOD AND SYSTEM

FIELD OF THE INVENTION

The present invention relates to a computer program, a classification method, and a system. In particular, the present invention relates to a program, method, and system that classifies multiple pieces of private data owned by multiple entities according to their types.

BACKGROUND OF THE INVENTION

Studies have been conducted for finding disease-causing genes by associating gene sequences with characters (characteristics) such as side effects of medicines or diseases in recent years. In particular, single nucleotide polymorphisms (SNPs), which occur when a single base in a single genome substitutes for another or is lost, characterize the genetic characters of individuals and provide an important information for tailoring medical care to constitutional prepositions of individuals (custom-tailored treatment) and the detection of disease-causing genes which is the purpose of linkage analysis.

In order to identify the gene locus that causes a disease in an SNP, a large amount of genetic information about diseased and normal individuals must be collected and the differences between them must be statistically analyzed. As a typical technique for this purpose, affected sib-pair analysis has been used (see "Web page on character mapping", URL: "http://www.genstat.net/", Naoyuki Kamatani et al., searched on May 10, 2005). Software for the analysis has also been disclosed at Mapmaker/sibs, which is located at the web address "linkage.rockefeller.edu.soft/".

In order to analyze genetic information by using the technique mentioned above, genetic information must be collected from various individuals and totalized. However, in many cases information about human genomes cannot be disclosed to a third entity in order to protect privacy because the information includes information about possible causes of diseases of individuals. Therefore, only institutions trusted by all informants have been allowed to collect and process such information (see "A Proposed Architecture for Trusted Third Party Services", N. Jefferies, C. Mitchell, and M. Walker, in Cryptography: Policy and Algorithms, Springer LNCS v. 1029, pp. 98-104 (1995). It has been also contemplated to collect information about disease and genes separately from patients' names if such a special institution is not available.

It is often difficult to provide a special institution trusted by all informants. Furthermore, there have been cases where patients carrying very peculiar diseases were able to be identified even though genetic information was separated from patients' names. To address the problem, a technique has been proposed that genetic information is classified by type to obtain statistic information required for analysis such as affected sib-pair analysis without disclosing the genetic information itself (see: "Information sharing across private databases", R. Agrawal, A. Evfimievski, and R. Srikant, In Proceedings of SIGMOD 2003).

FIG. 14 is a conceptual diagram of a process for classifying genetic information by type without disclosing the genetic information. Through the process shown, a receiver of genetic information can determine whether the receiver's own genetic information is of the same type as the genetic information provided from a sender. This process will be described below.

Symbol VS denotes a sender's genetic information, VR denotes a receiver's genetic information. The sender and receiver apply a common hash function to their genetic information to obtain hash values (S1), which are denoted as XS and XR. The sender encrypts the hash value XS by using the sender's own encryption key to obtain encrypted data YS (S2). The receiver encrypts the hash value XR by using the receiver's own encryption key to obtain encrypted data YR (S2). The sender and receiver exchange YS and YR with each other (S3). The sender then encrypts YR obtained by using his/her encryption key and sends the encrypted data to the receiver (S4). The receiver encrypts YS obtained by using his/her encryption key (S5). If the encrypted data are identical, the receiver determines that his/her genetic information is identical to the sender's genetic information (S6). The ciphers of the sender and receiver have the property of being able to provide the same encrypted data independently of the order of encryption (see: "A public key cryptosystem and a signature scheme based on discrete logarithms," T. ElGamel, IEEE Transactions on Information Theory, IT-31 (4): 469, 72, July 1985).

If there are three or more informants, the process described above is performed for any sets of the informants. As a result, each informant can determine the number of other informants who have the same genetic information as that of the informant. On the other hand, if an informant's genetic information differs from that of another informant, the former informant cannot gain the genetic information owned by the latter informant. By amassing the numbers of informants thus obtained for all informants, the number of pieces of genetic information owned by the informants can be obtained on a type-by-type basis without disclosing the genetic information itself.

A technique proposed in the aforementioned article by M. Numao also allows an informant to know that other informants have the same type of genetic information as that of the informant, without disclosing the informant's genetic information.

According to the technique described in the Agrawal article, each informant must exchange encrypted genetic information with other informants. The number of exchanges is approximately proportional to the square of the number of the informants. Accordingly, it has been difficult to complete the amassing of genetic information within realistic processing time if the number of informants is enormous. An object of the present invention is to enable a statistical method such as affected sib-pair analysis mentioned above to be applied to private data such as genetic information by totalizing the data without disclosing specifics of the data, by using an algorithm capable of accomplishing such amassing within a realistic processing time.

SUMMARY OF THE INVENTION

In a first aspect of the present invention, there is provided a program, a classification method for classifying private data using the program, and a system operated by the program, the program causing an information system to function as a system which classifies a plurality of pieces of private data owned by a plurality of entities by type, each of the plurality of entities having one of a plurality of encryption keys with which identical encrypted data can be obtained independently of the order of encryption, the program including: a representative entity selecting section which selects a representative entity representative of entities owning already classified private data of each type: an exchange section which causes the representative entity and a target entity which owns a piece of private data to be classified to exchange with each other encrypted data generated by encrypting their respective private data by using their own encryption keys; a first acquisition section which acquires first two-way encrypted data generated by re-encrypting the encrypted data that the target entity has obtained from each of the representative entities, using the encryption key of the target entity; a second acquisition section which acquires second two-way encrypted data generated by re-encrypting the encrypted data that each of the representative entity has obtained from the target entity, by using the encryption key of the representative entity; and a determination section which determines, for each of the representative parities, that the representative entity and the target entity own private data of an identical type, if the first two-way encrypted data generated for the representative entity matches the second two-way encrypted data.

In a second aspect of the present invention, there is provided a program, a classification method for classifying private data using the program, and a system operated by the program, the program causing an information system to function as a system which classifies a plurality of pieces of private data owned by each of a plurality of entities by type, each of the plurality of entities having one of a plurality of encryption keys with which identical encrypted data can be obtained independently of the order of encryption, the program including: a representative data selecting section which selects, for each type of a plurality of pieces of private data owned by a reference entity which is a entity owning private data already classified as a type, representative data representative of a set of private data of the type; a target entity selecting section which selects target entities owning private data to be classified one by one from among entities other than the reference entity; an exchange section which causes the reference entity and the target entity to exchange with each other encrypted data generated by encrypting their respective representative data by using the encryption key of the reference entity and encrypted data generated by encrypting at least one piece of private data owned by the target entity by using the encryption key of the target entity; a first acquisition section which acquires first two-way encrypted data generated by encrypting each piece of the encrypted data that the reference entity has obtained from the target entity by using the encryption key of the reference entity; a second acquisition section which acquires second two-way encrypted data generated by re-encrypting, by using the encryption key of the target entity, each piece of encrypted data that the target entity has obtained from the reference entity; and a determination section, which determines that the reference entity and the target entity owns private data of an identical type if each piece of first two-way encrypted data matches any of the second two-way encrypted data.

The summary of the invention given above does not enumerate all of essential features of the present invention. Sub-combinations of the features also constitute the present invention.

According to the present invention, private data owned by each data owner can be classified more efficiently than ever before without allowing the other data owners to know the private data.

BRIEF DESCRIPTION OF THE DRAWINGS

The invention will now be described in greater detail with reference to the appended figures in which:

FIG. 1 shows an overall view of a genetic information classification system according to an exemplary embodiment of the invention;

FIG. 2 shows an exemplary functional configuration of an entity according to an exemplary embodiment of the invention;

FIG. 3 shows functions of a management device 30 as functional blocks according to an exemplary embodiment of the invention;

FIG. 4 shows an example of a process performed by the management device 30 for classifying genetic information according to an exemplary embodiment of the invention;

FIG. 5 is a conceptual diagram illustrating a process flow in accordance with the present invention according to an exemplary embodiment of the invention;

FIG. 6 shows an overall view of a genetic information classification system 10 according to an exemplary embodiment of the invention;

FIG. 7 shows functions of a management device 70 as functional blocks according to an exemplary embodiment of the invention;

FIG. 8 shows an example of a process performed by the management device 70 for classifying genetic information according to an exemplary embodiment of the invention FIG. 9 is a conceptual diagram illustrating a process flow according to an embodiment of the present invention according to an exemplary embodiment of the invention;

FIG. 10 shows an overall view of an embodiment of the genetic information classification system 10 according to an exemplary embodiment of the invention;

FIG. 11 shows functions of a management system 110 as functional blocks according to an exemplary embodiment of the invention;

FIG. 12 shows an example of a process performed by the management device 110 for classifying genetic information according to an exemplary embodiment of the invention;

FIG. 13 shows an exemplary hardware configuration of an information system according to an exemplary embodiment of the invention; and FIG. 14 is a conceptual diagram of a process for classifying genetic information by type without disclosing the genetic information according to an exemplary embodiment of the invention.

DETAILED DESCRIPTION OF THE INVENTION

The present invention will be described with respect to embodiments thereof. However, the embodiments described herein do not limit the invention defined in the Claims and not all combinations of features described in the embodiments are necessarily requisites for the solution according to the present invention.

FIG. 1 shows an overall view of an embodiment of a genetic information classification system 10. The genetic information classification system 10 includes entities 20-1 to 20-N. Each of the entities 20-1 to 20-N is located at an organization capable of protecting security of information. For example, the entities 20-1 to 20-N may be terminal devices, each of which is associated with one of multiple organizations. More specifically, the entities 20-1 to 20-N may be personal computers owned by individuals. Alternatively, the entities 20-1 to 20-N may be patient management server computers, each being located in a hospital. In this case, each patient may have a magnetic card on which the patient's genetic information is recorded and the server computers may read genetic information from the magnetic card by using a card reader and hold the information.

Each of the entities 20-1 to 20-N holds genetic information. In FIG. 1, each type of genetic information is labeled with a reference number. For example, the type v1 of the genetic information of entity 20-1 is labeled 1, and the type v2 of genetic information of entity 20-2 is also labeled 1. The genetic information of entities 20-1 to 20-4 has already been classified and therefore, the types thereof are known. On the other hand, the genetic information of entity 20-5 has not yet been classified and the type thereof is yet unknown, although it is actually type 2.

The entities, 20-1 to 20-N in this example, analyze, one-by-one in order, their genetic information to determine whether the type of the genetic information is identical to any of the types of other genetic information. In the process of the analysis, the matching operation is performed, not between all entities having already classified genetic information, but only between entities that are representative of the entities having already classified genetic information. For example, entity 20-5 compares the type of its genetic information only with that of the genetic information of entities 20-1 and 20-3 to determine whether they are identical to each other, rather than comparing the type with each of those of entities 20-1 to 20-4. The purpose is to classify genetic information more efficiently. The entity 20-1 to 20-N may have other kinds of private data instead of genetic information. According to the first embodiment, each entity can classify any kind of private data without revealing the private data to the other entities.

FIG. 2 shows an exemplary functional configuration of entity 20-5. Each of the entities 20-1 to 20-N, other than entity 20-5, has functions approximately the same as those of entity 20-5 described in FIG. 2. Therefore, functions of only the entity 20-5 will be described with respect to FIG. 2 as representative of the entities 20-1 to 20-N. Entity 20-5 includes a genetic information recording unit 200, an encryption unit 210, and a management device 30. The genetic information recording unit 200 holds genetic information owned by entity 20-5. The encryption unit 210 encrypts the genetic information by using an encryption key owned by entity 20-5, in response to an instruction from the management device 30, and sends the encrypted information to at least one of the entities 20-1 to 20-N. A hash function may be applied to the genetic information before encrypting it, in order to make the information less vulnerable to leaks. The encryption unit 210 re-encrypts encrypted data received from at least one of the entities 20-1 to 20-N to generate two-way encrypted data and outputs it to the management device 30. The management device 30 controls the encryption unit 210 to determine whether entity 20-5 and another entity have genetic information of an identical type.

FIG. 3 shows functions of the management device 30 as functional blocks. The management device 30 includes a recording section 300, a representative entity selecting section 310, a target entity selecting section 320, an exchange section 330, a first acquisition section 340, a second acquisition section 350, a determination section 360, and a registration section 370. The assumption in the following description of the functions is that the genetic information in the entities 20-1 to 20-4 has been already classified by type. The recording section 300 records an entity that is representative of entities having genetic information of each of types of already classified genetic information. The recording section 300 may receive information indicating the representative entities from the recording section 300 of entity 20-4 and record it.

More specifically, the recording section 300 records entity 20-1 as a representative entity having genetic information of type 1 and records entity 20-3 as a representative entity having genetic information of type 2. The recording section 300 does not record entities 20-2 and 20-4. The recording section 300 records only representative entities and not the types of genetic information owned by them. This means that an administrator of entity 20-5 cannot know the type of genetic information owned by each representative entity even by analyzing information recorded in the recording section 300. The representative entity selecting section 310 selects a representative entity representing the entities having genetic information of each of types of already classified genetic information. In particular, the representative entity selecting section 310 searches the recording section 300 for a representative entity corresponding to each type of genetic information. In this example, the representative entity selecting section 310 selects entities 20-1 and 20-3 as the representative entities. The target entity selecting section 320 selects target entities one by one in a predetermined order from among entities having genetic information that has not yet been classified. In this example, the predetermined order is the order in which entities 20-1 to 20-N are specified in this order. The target entity selecting section 320 also selects the entity 20-5 (i.e. itself) succeeding entity 20-4 in the predetermined order as a target entity in response to an instruction from the target entity selecting section 320 of entity 20-4, as an example. Furthermore, the target entity selecting section 320 may notify the target entity selecting section 320 of entity 20-6 that it will specify entity 20-6 as the next target entity.

The exchange section 330 causes a representative entity and its target entity to exchange their respective private data encrypted by using their respective encryption keys. That is, the exchange section 330 instructs the encryption unit 210 to encrypt the genetic information of entity 20-5. The exchange section 330 also instructs entity 20-1 to encrypt the genetic information of entity 20-1 by using the encryption key of entity 20-1 and instructs entity 20-3 to encrypt the genetic information of entity 20-3 by using the encryption key of entity 20-3. The exchange section 330 then causes the encrypted data obtained at the encryption section 210 to be exchanged with each encrypted data obtained at each of entities 20-1 and 20-3.

The first acquisition section 340 obtains first two-way encrypted data generated by re-encrypting, by using the encryption key of a target entity, encrypted data obtained by the target entity from each representative entity. That is, genetic information of entity 20-1 is encrypted by using the encryption key of entity 20-1, and the encrypted data is re-encrypted by using the encryption key of entity 20-5. The first acquisition section 340 acquires the re-encrypted data as the first two-way encrypted data for entity 20-1. Also, genetic information of entity 20-3 is encrypted by using the encryption key of entity 20-3 and the encrypted data is re-encrypted by using the encryption key of entity 20-5. The first acquisition section 340 acquires the re-encrypted data as the first two-way encrypted data for entity 20-3.

The second acquisition section 350 obtains second two-way encrypted data generated by re-encrypting, the encrypted data that each representative entity has obtained from the target entity by using the encryption key of that representative entity. That is, genetic information of entity 20-5 is encrypted by using the encryption key of entity 20-5, and the encrypted data is re-encrypted by using the encryption key of entity 20-1. The second acquisition section 350 acquires the re-encrypted data as the second two-way encrypted data for entity 20-1. Also, genetic information of entity 20-5 is encrypted by using the encryption key of entity 20-5 and the encrypted data is re-encrypted by using the encryption key of entity 20-3. The second acquisition section 350 acquires the re-encrypted data as the second two-way encrypted data for entity 20-3.

The determination section 360 determines that a representative entity and a target entity have genetic information of an identical type if the first two-way encrypted data generated for the representative entity matches the second two-way encrypted data. Entity 20-5 has genetic information of type 2, as shown in FIG. 1. Accordingly, the determination section 360 determines that the first two-way encrypted data generated for entity 20-3 matches the second two-way encrypted data. Consequently, the determination section 360 determines that entity 20-3 and entity 20-5 have genetic information of an identical type and outputs the result of the determination. The registration section 370 registers a target entity in the recording section 300 as a new representative entity if the type of the genetic information of the target entity does not matches any of the types of genetic information of any representative entities. For example, the registration section 370 registers entity 20-5 as a new representative entity if the type of genetic information of entity 20-5 does not match any of the types of genetic information of entities 20-1 and 20-3. As a result, the recording section 300 sends information indicating all representative entities, including newly registered representative entities, to the recording section 300 of the next target entity, namely entity 20-6.

Each of the entities 20-1 to 20-N can determine whether the type of genetic information it owns is identical to that of genetic information of any of the other entities because each of the entities 20-1 to 20-N has the functions described with respect to FIG. 3. By compiling the results of the determination, the genetic information can be classified by type. Furthermore, by using the result of the classification, various statistical information such as the proportion of genetic information of each type to the population of the genetic information can be obtained. Methods for using and analyzing the statistical information are detailed in documents such as the document relating to affected sib-pair analysis mentioned above and therefore the description thereof will be omitted.

According to the functions described with respect to FIG. 3, each of the entities 20-1 to 20-N does not need to notify the type of the genetic information it owns to the other entities. Furthermore, when the results of the determination described above are compiled, only sets of entities that share genetic information of the same type are revealed and leakage of specific genetic information owned by each entity is prevented. Thus, private data, such as information about genes that possibly cause disease, can be protected from disclosure to third entities.

FIG. 4 shows an example of a process performed by the management device 30 for classifying genetic information. The management device 30 at each of the entities 20-1 to 20-N performs the process described below once for each gene locus. First, the target entity selecting section 320 selects target entities in a predetermined order from among multiple entities having genetic information that has not yet been classified (S400).

The representative entity selecting section 310 selects a representative entity representative of the entities having genetic information of each of the types of already classified genetic information (S410). Representative entities can be selected by using one of the following two methods.

(1) Method that Registers a Representative Entity

As described with respect to FIG. 3, the recording section 300 records a representative entity representative of the entities having genetic information of each of the types of already classified genetic information. The representative entity selecting section 310 can search through the representative entities recorded in the recording section 300 to retrieve and select a representative entity. If the information recorded in the recording section 300 is denoted as a variable Y, then it can be expressed as Y={P1, P3}.

(2) Method that Registers a Set of Entities for Each Type of Genetic Information In contrast to the implementation described with respect to FIG. 3, another implementation of the recording section 300 associates and records each type of genetic information already classified with a set of entity having genetic information of that type. In particular, referring to FIG. 1, the recording section 300 records entities 20-1, 20-2, 20-3 and 20-4 as a set of entities having genetic information of type 1. The recording section 300 records only entity 20-3 as a set of entities having genetic information of type 2. If the information recorded in the recording section 300 is noted as a variable Y, then it can be expressed as Y={{P1, P2, P4}, {P3}}.

In this case, the representative entity selecting section 310 selects a representative entity representing each type of genetic information from among the entities associated and recorded with that type in the recording section 300. In particular, the representative entity selecting section 310 selects one of entities 20-1, 20-2, and 20-4 as a representative entity and also selects entity 20-3 as another representative entity. Preferably, the representative entity selecting section 310 randomly selects a representative entity from each set of entities that have at least one piece of genetic information. In particular, the representative entity selecting section 310 randomly selects a representative entity from among entities 20-1, 20-2, and 20-4. This can prevent concentration of communication traffic on a particular entity.

More preferably, the representative entity selecting section 310 selects, for at least one type of genetic information, a representative entity from among sets of entities associated and recorded with that type, in a predetermined order each time a target entity is selected by the target entity selecting section 320. In particular, as entities 20-M, 20-(M+1), and 20-(M+2) are selected as target entities in this order, entities 20-1, 20-2, and 20-4 are selected as representative entities in this order. Thus, communication traffic can be further dispersed.

In another example, each time a target entity is selected for at least one type of private data by the target entity selecting section 320, the representative entity selecting section 310 selects a entity that communicates with the target entity at a data transfer rate higher than a predetermined reference rate as a representative entity from among the entities associated and recorded with that type. The data transfer rate between entities may be pre-estimated or may be measured each time a target entity is selected.

This concludes the description of step S410.

The exchange section 330 causes each pair of a representative entity and a target entity to exchange their private data encrypted by using their respective encryption keys (S420). The first acquisition section 340 acquires first two-way encrypted data generated by re-encrypting, using the target entity's encryption key, encrypted data that the target entity has obtained from each representative entity (S430). The second acquisition section 350 acquires second two-way encrypted data generated by re-encrypting, using each representative entity's key, encrypted data that the representative entity has obtained from the target entity (S440).

The determination section 360 determines, for each representative entity, that the representative entity and a target entity have genetic information of an identical type if the first the two-way encrypted data generated for the representative entity matches the second two-way encrypted data (S450). To improve the efficiency of the process for classifying genetic information, the management device 30 may perform the following operation.

If the type of genetic information of a target entity does not match that of any of the representative entities, the determination section 360 encrypts the genetic information of the target entity by using the target entity's encryption key and holds this encrypted data. The determination section 360 then may provide the encrypted data to personnel who compile the genetic information in the form of substitution cipher data that is disclosed as substitute for genetic information owned by the target entity. On the other hand, if the genetic information of a target entity matches the genetic information of any of the representative entities, the determination section 360 may disclose substitution cipher data disclosed by the representative entity as the substitution cipher data of the target entity. This allows the personnel who compile the genetic information to know the number of pieces of genetic information of each type owned by the entities without allowing the personnel to know the specifics of the genetic information itself.

Then, based on the result of the determination by the determination section 360, the registration section 370 registers the entities in the recording section 300 (S460). The registration operation varies depending upon the operation used for selecting representative entities described with respect to step S410.

(1) In the Case of Using the Method that Registers a Representative Entity

If the type of genetic information of a target entity does not match any of the types of genetic information of representative entity, the registration section 370 registers the target entity in the recording section 300 as a new representative entity.

(2) In the Case of Using the Method that Registers a Set of Entities for each Type of Genetic Information The registration section 370 registers a target entity in the recording section 300 in addition to already registered entity on the basis of the type of genetic information of the target entity determined by the determination section 360, regardless of whether the type matches that of genetic information of each representative entity. Specifically, if both a representative entities and a target entity have an identical type of genetic information, the registration section 370 adds the target entity to the set to which the representative entity belongs and registers it. On the other hand, if none of the representative entities has genetic information of the same type as that of a target entity, the registration section 370 registers in the registration section 300 the target entity as a new entity set consisting of that single entity.

This concludes the description of step S460.

According to the first embodiment described above, private data owned by each data owner can be classified more efficiently without revealing the data to the other data owners. Especially if private data is data on alleles, Assumption 1 given blow can be made.

Assumption 1: The type of private data is the type of alleles, the number of which is at most a little more than ten and therefore all of which are known (there are no unknown alleles).

Because a representative entity is selected for each type of allele, the number of representative entities will be equal to the number of the types of alleles at most. Therefore, the number of operations for exchanging genetic information performed at each target entity will, at most, be equal to the number of types of alleles. Thus, according to the first embodiment, an explosive increase in the amount of time required for classification can be prevented, even if the number of entities whose genetic information is to be analyzed increases. Thus, efficient classification processing can be accomplished.

In the first embodiment, the management device 30 is provided in each of entities 20-1 to 20-N, including entity 20-5. Alternatively, the management device 30 may be provided separately from the entities 20-1 to 20-N and may be shared by the entities 20-1 to 20-N. A process flow in such a configuration will be described as a variation of the first embodiment.

FIG. 5 is a conceptual diagram illustrating a process flow in the variation of the first embodiment. Each of entities 20-1 to 20-5 has the same hash function, h (x). Entity 20-1 has genetic information of type 1, entity 20-3 has genetic information of type 2, and entity 20-5 also has genetic information of type 2. A management device 30 in this variation is managed by an administrator different from any of the administrators of entities 20-1 to 20-N. In response to an instruction from an exchange section 330, entities 20-1 and 20-5 generate encrypted data and exchange the data with each other. Specifically, entity 20-5 first applies the hash function to genetic information of type 2 to calculate a hash value h (2) (S1). Entity 20-5 then encrypts the value h (2) by using the encryption key of entity 20-5 to generate encrypted data k5 (h (2)) (S2). Then, the exchange section 330 obtains the encrypted data k5 (h (2)) from entity 20-5 (S3), sends it to entity 20-1 (S4), and to entity 20-3 (S6).

Entity 20-1 re-encrypts the received encrypted data k5 (h (2)) by using its own encryption key to generate first two-way encrypted data k1 (k5 (h (2))). Entity 20-1 also applies the hash function to genetic information of type 1 and encrypts it by using its own encryption key to generate encrypted data k1 (h (1)). A first acquisition section 340 acquires the data K1 (k5 (h (2)) from entity 20-1 and an exchange section 330 acquires the data k1 (h (1)) from entity 20-1 (S5).

Entity 20-3 re-encrypts the received data k5 (h (2)) by using its own encryption key to generate first two-way encrypted data k3 (k5 (h (2)). Entity 20-3 also applies the hash function to the genetic information of type 2 to calculate the hash value h (2) and encrypts the calculated hash value h (2) by using its own encryption key to generate encrypted data k3 (h (2)). The first acquisition section 340 obtains first two-way encrypted data k3 (k5 (h (2))) from entity 20-3 and the exchange section 330 obtains the encrypted data k3 (h (2)) from entity 20-3 (S7).

The exchange section 330 sends the data k1 (h (1)) and k3 (h (2)) it obtained to entity 20-5 (S8). Entity 20-5 encrypts each of the received data k1 (h (1)) and k3 (h (2)) by using its own encryption key to generate second two-way encrypted data k5 (k1 (h (1))) and k5 (k3 (h (2))). A second acquisition section 350 acquires the data k5 (k1 (h (1))) and k5 (k3 (h (2))) from entity 20-5.

Because the data k1 (k5 (h (2)) and k5 (k1 (h (1)) do not match each other, a determination section 360 determines that entities 20-1 and 20-5 have genetic information of different types (S10). The determination section 360 determines that entities 20-3 and 20-5 have genetic information of an identical type because the data k3 (k5 (h (2))) and k5 (k3 (h2))) match each other. Based on the result of the determination, classification is accomplished.

Thus, according to this variation, genetic information can be classified more efficiently than before. Furthermore, according to the variation, only the management device 30 determines which entities have the same type of genetic information and the result of the determination is not disclosed to any of the entities 20-1 to 20-N. Moreover, in the management device 30, only encrypted data is processed and real genetic information is not used. That is, genetic information owned by each entity is unable to be identified even at the management device 30. Thus, according to the variation, leakage of private data can be further reduced.

FIG. 6 shows an overall view of another embodiment of the genetic information classification system 10. The genetic information classification system 10 includes entities 60-1 to 60-N and a management device 70. Each of the entities 60-1 to 60-N is located at an organization capable of protecting security of information. For example, the entities 60-1 to 60-N may be terminal devices, each of which is located at each of multiple organizations. By way of example, the entities 60-1 to 60-N may be patient management server computers, each being located in a hospital.

Each of the entities 60-1 to 60-N has multiple pieces of genetic information. In FIG. 6, each type of genetic information is labeled with a number. For example, entity 60-1 has genetic information of types 1, 3, and 4 and other types. Genetic information of entity 60-1 to 60-4 has already been classified and accordingly the type thereof is known. On the other hand, genetic information of entity 60-5 is yet to be classified and therefore the type thereof is unknown. Entity 60-5 actually has genetic information of types 2, 11, and 12 and others.

Each of the entities 60-1 to 60-N has multiple encrypted keys with which the same encrypted data can be obtained independently of the order of encryption.

A management device 70 is managed by an administrator different from any of the administrators of entities 60-1 to 60-N. The management device 70 classifies genetic information owned by each of the entities 60-1 to 60-N, makes certain determination, and outputs the result.

FIG. 7 shows functions of the management device 70 as functional blocks. The management device 70 includes a representative data selecting section 700, a target entity selecting section 710, an exchange section 720, a cache section 730, a first acquisition section 740, a second acquisition section 750, and a determination section 760. The representative data selecting section 700 selects representative data representative of a set of genetic information of each type that is owned by a reference entity, which owns multiple types of genetic information already classified. In this example, entity 60-1 is predetermined as the reference entity. Accordingly, the representative data selecting section 700 selects representative data for type-1 genetic information owned by entity 60-1, selects representative data for type-3 genetic information, and selects representative data from type-4 genetic information. Classification of genetic information in the entity 60-1 is accomplished by using the method described in the first embodiment or any of other known, conventional methods.

The target entity selecting section o710 selects target entities having genetic information to be classified one by one from entities other than the reference entity. The order in which the target entities are selected is predetermined. For example, entities 60-1 to 60-N are selected in this order as target entities. The target entity selecting section 710 may select the next target entity in response to the completion of classification of genetic information of a target entity by the determination section 760. The target entity selecting section 710 selects entity 60-5 as a target entity because the genetic information in entities 60-1 to 60-4 has already been classified.

The exchange section 720 causes the reference entity and a target entity to exchange each piece of encrypted data generated by encrypting each piece of representative data by using an encryption key of the reference entity and each piece of encrypted data generated by encrypting at least one piece of genetic information owned by the target entity by using an encryption key of the target entity. For example, the exchange section 720 first causes pieces of representative data to be encrypted using an encryption key of entity 60-1 to generate pieces of encrypted data. The exchange section 720 causes all pieces of genetic information owned by entity 60-5 to be encrypted using an encryption key of entity 60-5 to generate pieces of encrypted data. The exchange section 720 then causes the pieces of encrypted data generated at entity 60-1 to be exchanged with the pieces of encrypted data generated at entity 60-5.

The cache section 730 caches encrypted data sent from the reference entity to a target entity during the processing by the exchange section 720. Whichever entity 60-2 to 60-N is selected as the target entity, the encrypted data sent from the reference entity 60-1 to another entity is the same. Accordingly, once obtaining the encrypted data, the cache section 730 can cache and reuse it, thereby eliminating the need for operation for obtaining the encrypted data again. For example, the cache section 730 obtains encrypted data sent from entity 60-1 to entity 60-2 and caches it. The exchange section 720 then sends the encrypted data cached in the cache section 730 to the other target entities (entities 60-3 to 60-N). Thus, the exchange section 720 can omit part of operation for acquiring encrypted data, allowing encrypted data to be efficiently exchanged between the reference entity and each of the target entities in order.

The first acquisition section 740 acquires first two-way encrypted data generated by re-encrypting, with the encryption key of the reference entity, each piece of encrypted data that the reference entity has obtained from each target entity. In particular, the first acquisition section 740 causes each piece of encrypted data that entity 60-1 has obtained from entity 60-5, for example, to be re-encrypted by using the encryption key of entity 60-1 and acquires the re-encrypted data as the first two-way encrypted data.

The second acquisition section 750 acquires second two-way encrypted data generated by re-encrypting each piece of encrypted data that a target entity has obtained from the reference entity, by using the encryption key of the target entity. In particular, the second acquisition section 750 causes each piece of encrypted data that entity 60-5 has obtained from entity 60-1 to be re-encrypted by using the encryption key of entity 60-5 and acquires the re-encrypted data as the second two-way encrypted data.

If a piece of the first two-way encrypted data match any of the second two-way encrypted data, the determination section 760 determines that the reference entity and the target entity owns genetic information of an identical type. In particular, if the first two-way encrypted data acquired from entity 60-1 matches the second two-way encrypted data acquired from entity 60-5, the determination section 760 determines that entity 60-1 and entity 60-5 own the same type of genetic information and outputs the result of the determination. Techniques for making use of the result of the determination are well known in the art, as described with respect to FIG. 3.

The management device 70 in the second embodiment is managed by an administrator different from any of the administrators of entities 60-1 to 60-N and is provided separately from the entities 60-1 to 60-N. Alternatively, the management device 70 may be located at least one of the entities 60-1 to 60-N. In such a configuration, genetic information can also be efficiently classified without revealing the genetic information of each entity to the other entities.

FIG. 8 shows an example of a process performed by the management device 70 for classifying genetic information. The management device 70 repeats the following process for each target entity. The representative entity selecting section 700 selects data representative of a set of genetic information of each type owned by a reference entity, which has multiple types of genetic information already classified (S800). The target entity selecting section 710 selects a target entity that has genetic information to be classified from among the entities other than the reference entity (S810). The representative data selecting section 700 may also select at least one piece of representative data from the genetic information owned by the target entity.

The exchange section 720 causes the reference entity and the target entity to exchange each piece of encrypted data generated by encrypting each piece of representative data by using an encryption key of the reference entity and each piece of encrypted data generated by encrypting by using an encryption key of the target entity at least one piece of genetic information owned by the target entity (S820). If representative data is also selected from the target entity at step S810, representative data of the entities may be exchanged. That is, the exchange section 720 may cause the reference entity and the target entity to exchange each piece of encrypted data generated by encrypting each piece of representative data of the reference entity by using the encryption key of the reference entity and each piece of encrypted data generated by encrypting each piece of representative data of the target entity by using the encryption key of the target entity.

The first acquisition section 740 acquires each piece of first two-way encrypted data generated by re-encrypting, by using the reference entity's encryption key, each piece of encrypted data that the reference entity has obtained from the target entity (S830). The second acquisition section 750 acquires each piece of second two-way encrypted data generated by re-encrypting, by using the target entity's encryption key, each piece of encrypted data that the target entity has obtained from the reference entity (840).

If a piece of first encrypted data matches any of the second two-way encrypted data, the determination section 760 determines that the reference entity and the target entity have an identical type of genetic information (S850). For example, the determination section 760 may determine, for each representative data, the number of pieces of genetic information of the same type as that of the representative data on the basis of the number of matches between the first two-way encrypted data and second two-way encrypted data. The cache section 730 caches the encrypted data sent from the reference entity to the target entity during the processing by the exchange section 720, thereby allowing the exchange section 720 to use it in the subsequent processes (S860).

FIG. 9 is a conceptual diagram illustrating a process flow in the second embodiment. Each of entities 60-1 to 60-5 has the same hash function, h (x). Entity 60-1 has genetic information of type 1 and entity 60-5 has genetic information of type 2. Entities 60-1 and 60-5 generate and exchange encrypted data in accordance with an instruction from the exchange section 720. In particular, entity 60-5 first applies the hash function to genetic information of type 2 to calculate a hash value, h (2) (S1). Entity 60-5 then encrypts the hash value h (2) by using an encryption key of entity 60-5 to obtain k5 (h (2)) (S2). Entity 6-5 then sends k5 (h (2)) to the management device 70 (S3).

Then, the management device 70 sends k5 (h (2)) to entity 60-1 (S4). Entity 60-1 then sends k1 (k5 (h (2)) generated by encrypting received k5 (h (2)) by using the encryption key of entity 60-1 to the management device 70 (S5). Entity 60-1 applies the hash function to the type-1 genetic information it owns to calculate the hash value h (1), encrypts the calculated hash value h (1) to obtain encrypted data k1 (h (1)), and sends it to the management device 70.

The management device 70 sends only k1 (h (1)) among the encrypted data received to entity 60-5 (S6). Entity 60-5 encrypts k1 (h (1)) received by using its own encryption key to generate k5 (k1 (h (1)) and sends it to the management device 70 (S7). The management device 70 compares k1 (k5 (h (2))) with k5 (k1 (h (1))) and classifies the genetic information on the basis of the result of the comparison (S8).

According to the second embodiment described above, private data owned by each data owner can be classified more efficiently than before without revealing the data to the other data owners. Especially if private data is information about alleles and entities are medical institutions that conduct genetic research, Assumption 2 given below can be made in addition to Assumption 1 described above.

Assumption 2: Patients never check or manage their genetic information as secrete information by themselves. Instead, trusted medical institutions study patients' genetic information and register it in their own databases. In this case, a certain amount of genetic information is centralized in a single medical institution. Therefore, the number of entities is smaller than the total number of patients. Furthermore, all alleles appear in data owned by a single medical institution.

According to this assumption, the number of entities to be addressed can be decreased and therefore the efficiency of classification processes can be further improved. Furthermore, the privacy of patients can be protected because the medical institutions do not need to disclose genetic information to one another.

FIG. 10 shows an overall view of another embodiment of the genetic information classification system 10. The genetic information classification system 10 includes entities 100-1 to 100-N and a management device 110. Each of the entities 100-1 to 100-N is located at an organization capable of protecting the security of information. For example, the entities 100-1 to 100-N may be implemented by terminal devices that are associated with the entities and perform encryption processing at the entities.

Each of the entities 100-1 to 100-N owns genetic information. In FIG. 10, each type of genetic information is labeled with a number. For example, entity 100-1 has genetic information of type 1 and entity 100-2 has genetic information of type 2. The genetic information of entities 100-1, 100-3, and 100-6 has already been classified and therefore its type is known. On the other hand, the genetic information of entities 100-2, 100-4, and 100-5 has not yet been classified and therefore its type is unknown. Actually, entity 100-2 has genetic information of type 2, part 100-4 has genetic information of type 2, and entity 100-5 has genetic information of type 3.

The management device 110 is managed by an administrator different from any of the administrators of entities 100-1 to 100-N. The management device 110 classifieds the genetic information owned by each of the entities 100-1 to 100-N, performs certain determination, and outputs the result of the determination.

FIG. 11 shows functions of the management device 110 as functional blocks. The management device 110 includes a reference entity selecting section 1000, an unclassified entity selecting section 1010, an exchange section 1020, a first acquisition section 1030, a second acquisition section 1040, and a determination section 1050. The reference entity selecting section 1000 selects entities that own already classified genetic information as a reference entity one by one in order. The unclassified entity selecting section 1010 selects unclassified entities that own genetic information that has not yet been classified. The exchange section 1020 causes an unclassified entity and a reference entity to exchange encrypted data generated by encrypting their genetic information by using their respective encryption keys.

The first acquisition section 1030 acquires first two-way encrypted date generated by re-encrypting, by using the encryption key of the reference entity, encrypted data that the reference entity has obtained from each unclassified entity. The second acquisition section 1040 acquires second two-way encrypted data generated by re-encrypting encrypted data that each unclassified entity has obtained from the reference entity, by using the encryption key of the unclassified entity. The determination section 1050 determines, for each unclassified entity, that the unclassified entity and the reference entity have an identical type of genetic information, if the first two-way encrypted data generated for that unclassified entity matches the second two-way encrypted data.

In response to the result of determination by the determination section 1050, the reference entity selecting section 1000 selects the next reference entity and the unclassified entity selecting section 1010 selects the next unclassified entity. Specifically, the unclassified entity selecting section 1010 selects as the next unclassified entity an unclassified entity having genetic information of a type that does not match that of the genetic information of the reference entity. The reference entity selecting section 1000 selects as the next reference entity any of the unclassified entities having genetic information of the same type as that of the genetic information of the reference entity.

FIG. 12 shows an example of a process performed by the management device 110 for classifying genetic information. The reference entity selecting section 1000 selects an entity having already classified genetic information as the reference entity (S1200). The unclassified entity selecting section 1010 selects an unclassified entity having genetic information that has not yet been classified (S1210). The exchange section 1020 causes each unclassified entity and the reference entity to exchange encrypted data generated by encrypting their genetic information by using their respective encrypted keys (S1220).

The first acquisition section 1030 acquires first two-way encrypted data generated by re-encrypting, by using the encryption key of the reference entity, encrypted data that the reference entity has obtained from each unclassified entity (S1230). The second acquisition section 1040 acquires second two-way encrypted data generated by re-encrypting the encrypted data that each unclassified entity has obtained from the reference entity by using the unclassified entity's encryption key (S1240). The determination section 1050 determines, for each unclassified entity, that the unclassified entity and the reference entity have an identical type of genetic information, if the first two-way encrypted data generated for the unclassified entity matches the second two-way encrypted data (S1250).

If classification of the genetic information of all entities has been completed (S1260: YES), the management device 110 will end the process shown in FIG. 12. On the other hand, if any of the entities are yet to be classified (S1260: NO), the management device 110 returns to step S1200. At S1200, the reference entity selecting section 1000 selects any of the unclassified entities having genetic information of the same type as that of the reference entity as the next reference entity (S1200). The unclassified entity selecting section 1010 selects as the next unclassified entity each unclassified entity having genetic information of the type that does not match that of the genetic information of the reference entity (S1210). The exchange section 1020 performs exchange processing for the reference and unclassified entities (S1220). The subsequent steps are the same as those described above and therefore the description thereof will be omitted.

Through the process shown in FIG. 12, as in the first and second embodiments, private data owned by each owner can be classified without revealing the private data to the other data owners. Furthermore, as in the first and second embodiments, processing time required for classification is reduced and the efficiency of the processing is improved as compared with the conventional processing.

FIG. 13 shows an exemplary hardware configuration of an information system 500 that functions as a entity 20-5, management device 70 or 110 in the embodiments described above. The information system 500 includes a CPU section including a CPU 1300, a RAM 1320, and a graphic controller 1375 which are interconnected through a host controller 1382, an input/output section including a communication interface 1330, a hard disk drive 1340, and a CD-ROM drive 1360 which are connected to the host controller 1382 through the input/output controller 1384, and a legacy input/output section including a ROM 1310, a flexible disk drive 1350, and an input/output chip 1370 which are connected to the input/output controller 1384.

The host controller 1382 connects the CPU 1300 and the graphic controller 1375, which access the RAM 1320 at higher transfer rates, with the RAM 1320. The CPU 1300 operates according to programs stored in the ROM 1310 and the RAM 1320 to control components of the information system 500. The graphic controller 1375 obtains image data generated by the CPU 1300 on a frame buffer provided in the RAM 1320 and causes it to be displayed on a display device 1380. Alternatively, the graphic controller 1375 may contain therein a frame buffer for storing image data generated by the CPU 1300 and so on.

The input/output controller 1384 connects the host controller 1382 with the communication interface 1330, the hard disk drive 1340, and the CD-ROM drive 1360, which are relatively fast input/output devices. The communication interface 1330 communicates with external devices through a network. The hard disk drive 1340 stores programs and data used by the information system 500. The CD-ROM drive 1360 reads a program or data from a CD-ROM 1395 and provides it to the RAM 1320 or the hard disk drive 1340.

Connected to the input-output controller 1384 are relatively slow input/output devices such as ROM 1310, the flexible disk drive 1350 and the input/output chip 1370. The ROM 1310 stores a boot program executed by the CPU 1300 during boot-up of the information system 500 and programs dependent on the hardware of the information system 500. The flexible-disk drive 1350 reads a program or data from a flexible disk 1390 and provides it to the RAM 1320 or the hard disk drive 1340 through the input/output chip 1370. The input/output chip 1370 connects the flexible disk 1390, and various input/output devices through ports such as a parallel port, serial port, keyboard port, and mouse port, for example.

A program to be provided to the information system 500 is stored on a recording medium such as a flexible disk 1390, a CD-ROM 1395, or an IC card and provided by a user. The program is read from the recording medium and installed in the information system 500 through the input/output chip 1370 and/or input/output controller 1384 and executed. Operations performed by the information system 500 under the control of the program are the same as the operations in the entity 20-5 or management device 70 or 110 described with reference to FIGS. 1 to 12 and therefore the description thereof will be omitted.

The programs mentioned above may be stored in an external storage medium. The storage medium may be a flexible disk 1390 or a CD-ROM 1395, or an optical recording medium such as a DVD and PD, a magneto-optical recording medium such as an MD, a tape medium, or a semiconductor memory such as an IC card. Alternatively, a storage device such as a hard disk or a RAM provided in a server system connected to a private communication network or the Internet may be used as the recording medium and the program may be provided from the storage device to the information system 500 over the network. Supplementary description of the processes described with respect to the embodiments will be given below.

(1) Affected Sib-Pair Analysis

In the first embodiment, each of the entities 20-1 to 20-N is capable of determining which of the entities has genetic information of the same type as that of its own genetic information. By compiling the result of determination, genetic information of each entity can be classified by its type. The result of classification can be used for affected sib-pair analysis. Affected sib-pair analysis will be described below.

Affected sib-pair analysis is conducted on data as given below, for example.

Family ID=1, Individual ID=21, Father ID=0, Mother ID=0, Sex ID=1, Disease ID=1, Allele 1=1/1, Allele 2=3/5

Family ID=1, Individual ID=22, Father ID=0, Mother ID=0, Sex ID=2, Disease ID=1, Allele 1=1/1, Allele 2=4/7

Family ID=1, Individual ID=23, Father ID=21, Mother ID=22, Sex ID=1, Disease ID=2, Allele 1=1/1, Allele 2=5/7

Family ID=1, Individual ID=24, Father ID=21, Mother ID=22, Sex ID=2, Disease ID=2, Allele 1=1/1, Allele 2=3/4

In the data, Allele 1 represents an allele pair at a particular locus. Allele 2 represents an allele pair at a locus different from that of Allele 1. In affected sib-pair analysis, a parameter called the IBD (Identity By Descent) is used. IBD alleles are alleles of two individuals that are identical copies of the same allele in an ancestor. In affected sib-pair analysis, IBD between individuals related by birth is considered. For example, assume that, at a given locus, the genotype of father F is 1/2 and that of mother M is 3/4. If the genotypes of their four children Ck, (i=1, ..., 4) are 1/3, 1/3, 1/4, and 2/4, respectively, then IBD=1, because F and Ck as well as M and Ck share one allele. IBD between parents and children is always 1.

On the other hand, IBD between the siblings C1 (1/3) and C1 (1/3) is 2 because they share "1" and "3"; IBD between the siblings C1 (1/3) and C3 (1/4) is 1 because they share only "1"; and IBD between the siblings C1 (1/3) and C4 (2/4) is "0" because they share no alleles. In this case, the probability that the IBD between the siblings will be "0" and "2" is 0.25 and the probability that the IBD will be "1" is 0.5.

The principle of affected sib-pair analysis will be briefly described below. Assume that data on affected sib-pairs (siblings having a developed disease) are collected and investigation as described above is performed on this group. If a marker gene links with the disease, a discrepancy from the ratio (1:2:1) would arise (the number of pairs with IBD=2 would increase and the number of pairs with IBD=0 would decrease). On the other hand, for a marker gene that does not link with a disease-causing gene, the ratio would be the same as that in random siblings (1:2:1).

In affected sib-pair analysis, based on this assumption, the likelihood of observed data is calculated by using a discrepancy in the proportion of alleles shared in affected sib-pairs as a measure. The likelihood can be expressed as:

[Formula 1]

$$L(z) = \prod_{j=1}^{N} \prod_{i=0}^{2} z_i w_{ij} \quad (1)$$

Here $w_{ij}$ denotes the probability that the IBD of an affected sib-pair in the j-th pedigree will be IBD=i. The variable is z=(z0, z1, z2) and the degree of freedom is 2 (z2=1−z1−z0). Therefore, the independent variables are z0 and z1. The ratio of the likelihood to the likelihood in the case that the marker gene does not link with the disease-causing gene (that is, in the case of z0=0.25, z1=0.5, and z2=0.25) is calculated and the maximum likelihood method is used to obtain the value of z that yields the maximum likelihood. Software for obtaining the value of z that yields the maximum likelihood from pedigree data and genetic information of individuals has been disclosed.

(2) Encryption Keys with which Identical Encrypted Data can be Obtained Independently of the Order of Encryption As has been stated, encryption functions used by each entity for encryption in the present embodiments must provide identical encryption data independently of the order of encryption. For example, for encryption functions f and g and message x, the equation f (g (x))=g (f (x)) must hold. Such encryption system is called the Commutative Encryption (CE). Properties required for implementing Commutative Encryption will be given below.

(2-1) Indistinguishability

Distributions in a finite domain $\Omega k \subseteq \{0, 1\}$ k are denoted as D1 and D2, a polynomial time algorithm relating to k that returns true/false when x∈Ωk is given is denoted as $A_k(x)$, and any polynomial expression is denoted as p(k). If the following expression is satisfied for all sufficiently large values of k,

[Formula 2]

$$Pr[A_k(x) \mid x \sim D_1] - Pr[A_k(x) \mid x \sim D_2] < \frac{1}{p(k)} \quad (2)$$

then, $D_1$ is said to be computationally indistinguishable from D2.

(2-2) Communicative Encryption

Communicative encryption can be represented by a function f: keyF×DomF→DomF in a finite domain that meets the following properties.

(a) For all e and e' ∈ key, fe·fe=fe'·fe'.

(b) For fe, DomF→DomF is bijection.

(c) The inverse $f_e^{-1}$ can be calculated by using polynomial time if "e" is given.

(d) The distribution <x, fe (x), y, fe (x)> is indistinguishable from the distribution <x, fe (x), y, z>, where x, y, z ∈r DomF and, e∈rDomF, and ∈ r represents a uniform random selection from the domain.

(3-3) Example of Commutative Encryption

Assume that the domain F is the set of all quadratic residues modulo p. That is, both p and q=(p−1)/2 are primes, which are called safe primes, and KeyF is {1, 2, ..., q−1}. Assume the Decision Diffie-Hellman assumption, then,

[Formula 3]

$$f_e(x) \equiv x^e \bmod p \quad (3)$$

is commutative encryption. For example,

[Formula 4]

$$(x_d \bmod p)^e \bmod P = x^{de} \bmod P = (x^e \bmod p)^d \bmod p \quad (4)$$

The other conditions are satisfied as described in the aforementioned Agrawal, et al article.

According to the embodiments descried above, private data of all owners can be efficiently classified without revealing private data owned by each owner to the other owners. This classification can be accomplished in a far shorter processing time than the conventional method, which requires processing time proportional to the square of the number of data owners. In the experiments conducted by the inventors using data of 1,000 owners, the time required for the processing using the method of the first embodiment was approximately one seventieth of that of the conventional method. Further, in experiments using data of 10 medical institutions, the time required for the processing using the method of the second embodiment was approximately one thousandth of that of the conventional method. Thus, according to the embodiments described above, the result of classification that can be applied to various kinds of analysis such as affected sib-pair analysis can be obtained far more efficiently than before.

While the present invention has been descried with respect to embodiments thereof, the technical scope of the present invention is not limited to that described with the embodiments. It will be apparent to those skilled in the art that various modifications or improvements can be made to the embodiment. It will be apparent from the Claims that embodiments to which such modifications and improvements are made also fall within the technical scope of the present invention.

The invention claimed is:

1. A method for classifying a plurality of pieces of private data, comprising:

recording on a computer-readable medium, a plurality of representative entities wherein the representative entities represent genetic information associated with the private data, wherein the representative entities are recorded without recording genetic information types of the representative entities;

classifying the representative entities by one of a plurality of registered genetic information types;

identifying unclassified representative entities;

selecting one of the classified representative entities;

selecting a target entity from the classified and the unclassified entities;

exchanging encrypted private data between the selected one of the classified representative entities and the selected target entity using a first encryption key for the selected one of the classified representative entities and a second encryption key for the target entity;

acquiring a first two-way encrypted private data generated by further encrypting the encrypted private data that the selected target entity received from the selected one of the classified representative entities, by using the encryption key of the selected target entity;

acquiring a second two-way encrypted private data generated by further encrypting the encrypted private data that the selected one of the representative classified entities has obtained from the selected target entity, by using the encryption key of the selected one of the classified representative entities;

analyzing by each of the classified representative entities of their own genetic information to determine if their genetic information type is identical to the genetic information type of one of the other classified representative entities;

determining that the private data of the selected one of the classified representative entities and the private data of the selected target entity are of an identical genetic information type when the first two-way encrypted data matches the second two-way encrypted private data;

reusing the encrypted private data sent from one of the classified representative entities to the selected target entity; and registering on the computer-readable medium that the selected target entity is a new representative entity where the genetic information type of the selected target entity does not match the genetic information of the classified representative entities.

2. A classification method for classifying a plurality of pieces of private data, comprising:

storing on a hard disk drive a plurality of representative entities wherein the representative entities include genetic information associated with the private data;

performing pre-encryption hashing of the genetic information;

classifying on the hard disk drive the representative entities according to a genetic information type based on the genetic information;

selecting one of the representative entities as a reference entity whose type of genetic information has already been classified;

selecting a target entity other than the reference entity wherein the reference entity is classified with a same genetic information type as the target entity;

exchanging a piece of encrypted data between the reference entity and the target entity wherein the reference entity exchanges a piece of encrypted reference entity data encrypted by reference entity encryption key owned by the reference entity for a target entity encrypted data encrypted by a target entity encryption key owned by the target entity;

acquiring a first two-way encrypted data generated by further encrypting the piece of target entity encrypted data that the reference entity has obtained from the target entity using the reference entity encryption key owned by the reference entity, and by further encrypting the first two-way encrypted data with a first hash function after encryption using the encryption key owned by the reference entity;

acquiring a second two-way encrypted data generated by further encrypting the piece of reference entity encrypted data that the target entity has obtained from the reference entity by using the target entity encryption key of the target entity and by further encrypting the second two-way encrypted data with a second hash function after encryption using the encryption key of the target entity;

determining that the genetic information of the reference entity and the genetic information of the target entity are identical, if the first two-way encrypted data matches the second two-way encrypted data; and determining a proportion of genetic information of each type with respect to the genetic information of all the plurality of representative entities;

analyzing by each of the plurality of representative entities of their own genetic information to determine if their genetic information type is identical to the genetic information type of one of the plurality of representative entities; and registering on the hard disk drive the target entity and the reference entity as representative entities containing identical genetic information.

3. The method of claim 2, wherein a data transfer rate between the reference entity and the target entity is re-measured each time the target entity is selected.

* * * * *